United States Patent
Nolin et al.

(10) Patent No.: US 11,528,843 B2
(45) Date of Patent: Dec. 20, 2022

(54) TRIMMER HEAD ASSEMBLY FOR A TRIMMER

(71) Applicant: TECHTRONIC CORDLESS GP, Anderson, SC (US)

(72) Inventors: J. Eric Nolin, Anderson, SC (US); Ron Hoffman, Iva, SC (US); Andrew M. Schmidt, Anderson, SC (US); Fahad T. Vora, Anderson, SC (US)

(73) Assignee: Techtronic Cordless GP, Anderson, SC (US)

( * ) Notice: Subject to any disclaimer, the term of this patent is extended or adjusted under 35 U.S.C. 154(b) by 239 days.

(21) Appl. No.: 16/745,941

(22) Filed: Jan. 17, 2020

(65) Prior Publication Data

US 2020/0236847 A1    Jul. 30, 2020

Related U.S. Application Data

(60) Provisional application No. 62/796,755, filed on Jan. 25, 2019.

(51) Int. Cl.
*A01D 34/416*    (2006.01)
*A01D 34/84*    (2006.01)

(52) U.S. Cl.
CPC .......... *A01D 34/416* (2013.01); *A01D 34/84* (2013.01)

(58) Field of Classification Search
CPC ............... A01D 34/412; A01D 34/416; A01D 34/4165; A01D 34/4166; A01D 34/535; A01D 34/62; A01D 34/68; A01D 34/73; A01D 34/733; A01D 34/736; A01D 34/84
USPC .......................................... 30/276; 56/12.7, 17
See application file for complete search history.

(56) References Cited

U.S. PATENT DOCUMENTS

| D299,484 S | * | 1/1989 | Lee .................................... D8/8 |
| D301,110 S | * | 5/1989 | Barbula ............................. D8/7 |
| 5,617,636 A | * | 4/1997 | Taggett ................ A01D 34/736 |
| | | | 30/276 |
| 5,622,035 A | | 4/1997 | Kondo et al. |
| 5,791,054 A | * | 8/1998 | Bessinger .......... A01D 34/4166 |
| | | | 30/276 |

(Continued)

FOREIGN PATENT DOCUMENTS

| CN | 206165186 U | 5/2017 |
| CN | 104938135 B | 6/2017 |

(Continued)

OTHER PUBLICATIONS

European Search Report Corresponding to Application No. EP21161252 dated Aug. 17, 2021.

(Continued)

*Primary Examiner* — Jason Daniel Prone
(74) *Attorney, Agent, or Firm* — Dority & Manning, P.A.

(57) ABSTRACT

A trimmer head or trimmer head assembly for a trimmer is provided herein. The trimmer head may include a base plate defining an axial direction, a pivot head, and a blade retainer. The pivot head may be attached to the base plate. The blade retainer may include a radial arm rotatably mounted to the base plate to rotate relative to the base plate between a first position at which the radial arm is circumferentially aligned with the pivot head and a second position at which the radial arm is circumferentially spaced apart from the pivot head.

20 Claims, 7 Drawing Sheets

(56) References Cited

U.S. PATENT DOCUMENTS

| | | | |
|---|---|---|---|
| 5,852,876 A * | 12/1998 | Wang | A01D 34/736 30/276 |
| 6,112,416 A * | 9/2000 | Bridges | A01D 34/733 30/276 |
| 6,119,350 A | 9/2000 | Sutliff et al. | |
| 6,427,341 B1 * | 8/2002 | Lee | A01D 34/73 30/276 |
| 6,594,907 B2 | 7/2003 | Wilson | |
| 6,817,102 B2 * | 11/2004 | Harris | A01D 34/733 30/276 |
| 6,912,789 B2 | 7/2005 | Price | |
| 6,983,543 B2 | 1/2006 | Fogle | |
| 7,743,511 B2 | 6/2010 | Jerez | |
| 7,913,401 B2 | 3/2011 | Iacona | |
| 8,061,042 B2 * | 11/2011 | Arnetoli | A01D 34/4166 30/276 |
| 8,069,758 B2 | 12/2011 | Zhang | |
| 8,640,588 B2 | 2/2014 | Strader | |
| 8,769,831 B2 | 7/2014 | Duvall | |
| 8,863,395 B2 * | 10/2014 | Alliss | A01D 34/4166 56/12.7 |
| 8,925,206 B2 * | 1/2015 | Cigarini | A01D 34/733 30/276 |
| 8,973,274 B2 * | 3/2015 | Proulx | A01D 34/4166 30/276 |
| 9,320,195 B2 * | 4/2016 | Weimer | A01D 34/416 |
| D756,728 S | 5/2016 | Aliss | |
| 9,380,743 B2 | 7/2016 | Alliss | |
| 9,603,301 B2 | 3/2017 | Jerez | |
| 9,642,302 B2 * | 5/2017 | Jerez | A01D 34/4166 |
| 9,743,582 B2 | 8/2017 | Banjo | |
| 9,801,335 B2 | 10/2017 | Skinner | |
| 9,861,033 B2 | 1/2018 | Skinner | |
| 9,986,682 B2 | 6/2018 | Skinner | |
| 10,070,582 B2 * | 9/2018 | Nolin | A01D 34/4166 |
| 10,278,327 B2 * | 5/2019 | Skinner | A01D 34/733 |
| 10,306,830 B2 * | 6/2019 | Nolin et al. | A01D 34/4163 |
| 10,694,663 B2 * | 6/2020 | Lang | A01D 34/4166 |
| 10,952,371 B2 * | 3/2021 | Shin | A01D 34/733 |
| 2008/0196255 A1 * | 8/2008 | Strader | A01D 34/736 30/276 |
| 2008/0271424 A1 * | 11/2008 | Alliss | A01D 34/4166 56/12.7 |
| 2010/0000099 A1 * | 1/2010 | Arnetoli | A01D 34/4166 30/347 |
| 2010/0083506 A1 * | 4/2010 | Bennett | A01D 34/733 30/122 |
| 2010/0122516 A1 * | 5/2010 | Nolin | A01D 34/416 56/12.7 |
| 2014/0150267 A1 * | 6/2014 | Sowell | A01D 34/84 30/276 |
| 2015/0201557 A1 | 7/2015 | Jerez | |
| 2015/0245558 A1 | 9/2015 | Morabit | |
| 2015/0342116 A1 | 12/2015 | Sprungman | |
| 2015/0359172 A1 * | 12/2015 | Nelson | A01D 34/733 30/276 |
| 2015/0366131 A1 | 12/2015 | Skinner | |
| 2016/0227705 A1 * | 8/2016 | Nolin | A01D 34/4166 |
| 2016/0324067 A1 | 11/2016 | Skinner | |
| 2017/0006775 A1 | 1/2017 | Wyne | |
| 2017/0349394 A1 * | 12/2017 | Alliss | A01D 34/4166 |
| 2018/0103582 A1 | 4/2018 | Self | |
| 2018/0242520 A1 * | 8/2018 | Zenkus | A01D 34/416 |
| 2019/0021225 A1 * | 1/2019 | Cigarini | A01D 34/733 |
| 2020/0214202 A1 * | 7/2020 | Holman | A01D 34/736 |
| 2020/0352095 A1 * | 11/2020 | Jerez | A01D 34/733 |
| 2022/0240445 A1 * | 8/2022 | Hoffman et al. | A01D 34/736 |

FOREIGN PATENT DOCUMENTS

| | | | | |
|---|---|---|---|---|
| CN | 206393677 U | 8/2017 | | |
| CN | 207543273 U | 6/2018 | | |
| DE | 102015107571 A1 | 11/2016 | | |
| EP | 1358787 B1 | 2/2005 | | |
| EP | 2798937 A1 | 11/2014 | | |
| EP | 3143865 A2 | 3/2017 | | |
| EP | 3685654 A3 * | 9/2020 | | A01D 34/416 |
| JP | 4328365 B2 | 9/2009 | | |
| WO | WO2016209913 A1 | 12/2016 | | |

OTHER PUBLICATIONS

EP Search Report corresponding to Application No. EP22157304 dated May 9, 2022 (1 page).

Chinese Office Action Corresponding with Application No. 202010075242.2 dated Sep. 16, 2022 (1 page).

* cited by examiner

TRIMMER HEAD ASSEMBLY FOR A TRIMMER

This application claims the benefit of priority to U.S. Patent Application No. 62/796,755, filed on Jan. 25, 2019, the disclosure of which is incorporated by reference herein in its entirety.

FIELD OF THE INVENTION

The present subject matter relates generally to trimmer devices, such as landscape trimmers, and more particularly to a trimmer head assembly for a trimmer.

BACKGROUND OF THE INVENTION

Landscape trimmers are typically useful for cutting grass or weeds, and may be used for edging around trees, fences, landscape borders, etc. Conventional landscape trimmers are often referred to as string trimmers and include an elongated shaft with a rotating head attached to one end of the elongated shaft. A spool or segment of monofilament string is often fixed to the rotating head in such embodiments. Thus, the monofilament string may rotate with the rotating head and act as cutting element. Recently, trimmers having solid, non-string cutting elements (e.g., blades) attached to the rotating head have been utilized.

There can be various shortcomings for existing trimmers. For instance, when selecting or buying a trimmer, a user is often forced to decide whether string cutting elements or solid blades are preferred. If a user later wishes to use a different cutting element, that user must often purchase a completely new rotating head or landscape trimmer. Moreover, regardless of what type of cutting element is chosen, the cutting elements will eventually need to be replaced. This typically requires significant disassembly of the rotating head. For instance, at least a portion of the rotating head must be removed from the elongated shaft before cutting elements can be replaced and the rotating head is returned to the elongated shaft. These can all be cumbersome sources of frustration for users.

As a result, further improvements would be desirable in the field of landscape trimmers. In particular, it would useful for a rotating head to permit a user to selectively or alternately utilize a string or blade cutting element. Additionally or alternatively, it would be advantageous for rotating head to permit a cutting element to be selectively replaced without requiring significant disassembly or removal of the rotating head from an elongated shaft or body of a landscape trimmer.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a trimmer head for a trimmer is provided. The trimmer head may include a base plate defining an axial direction, a pivot head, and a blade retainer. The pivot head may include an extended post having a blade support surface to selectively receive a flail blade, and a main body. The main body may be positioned between the extended post and the base plate along the axial direction. The main body may define a string slot to receive a trimmer string line therethrough. The blade retainer may include a radial arm rotatably mounted to the base plate to rotate relative to the base plate between a first position at which the radial arm is circumferentially aligned with the pivot head and a second position at which the radial arm is circumferentially spaced apart from the pivot head. The blade support surface may be positioned between the base plate and the radial arm along the axial direction.

In another exemplary aspect of the present disclosure, a trimmer head for a trimmer is provided. The trimmer head may include a base plate defining an axial direction, a pivot head, and a blade retainer. The pivot head may be attached to the base plate. The pivot head may include an extended post having a blade support surface to selectively receive a flail blade. The blade retainer may include a mounting arm, an axial arm, and a radial arm. The mounting arm may be rotatably mounted to the base plate below the blade support surface along the axial direction. The axial arm may extend axially from a proximal end at the mounting arm to a distal end above the blade support surface. The radial arm may extend radially from the distal end to rotate relative to the base plate between a first position at which the radial arm is circumferentially aligned with the pivot head and a second position at which the radial arm is circumferentially spaced apart from the pivot head. The blade support surface may be positioned between the radial arm and the base plate relative to the axial direction.

In yet another exemplary aspect of the present disclosure, a trimmer head for a trimmer is provided. The trimmer head may include a base plate defining an axial direction, a first snap surface, a second snap surface, a pivot head, and a blade retainer. The first snap surface may extend from the base plate. The second snap surface may extend from the base plate and circumferentially spaced apart from the first snap surface. The pivot head may be attached to the base plate. The pivot head may include an extended post having a blade support surface to selectively receive a flail blade. The blade retainer may include a radial arm, and a resilient detent. The radial arm may be rotatably mounted to the base plate to rotate relative to the base plate between a first position at which the radial arm is circumferentially aligned with the pivot head and a second position at which the radial arm is circumferentially spaced apart from the pivot head. The resilient detent may be held in a frictional-fit lock against the first snap surface in the first position and against the second snap surface in the second position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
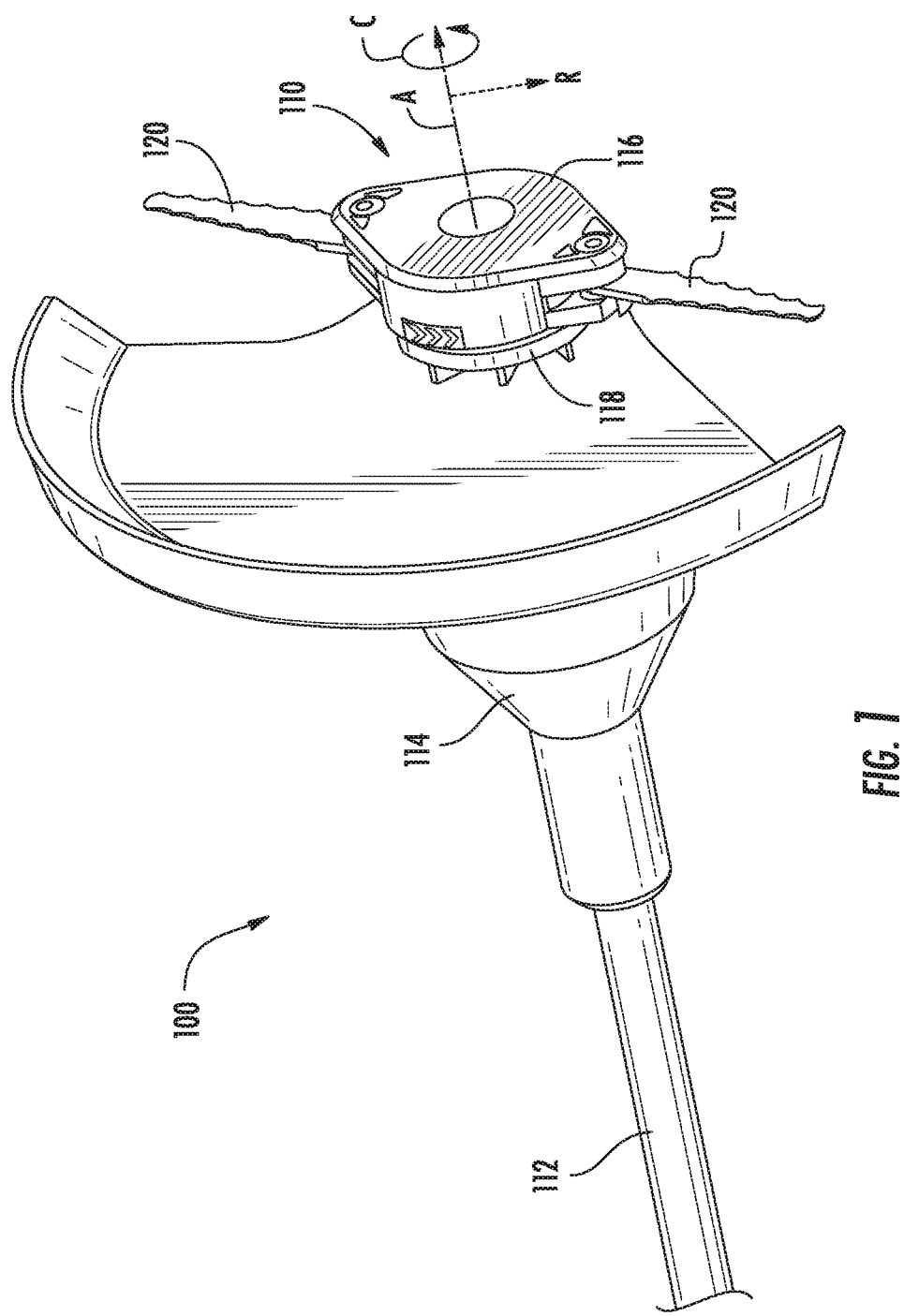
FIG. 1 provides a perspective view of a landscape trimmer according to exemplary embodiments of the present disclosure.
Figure 2:
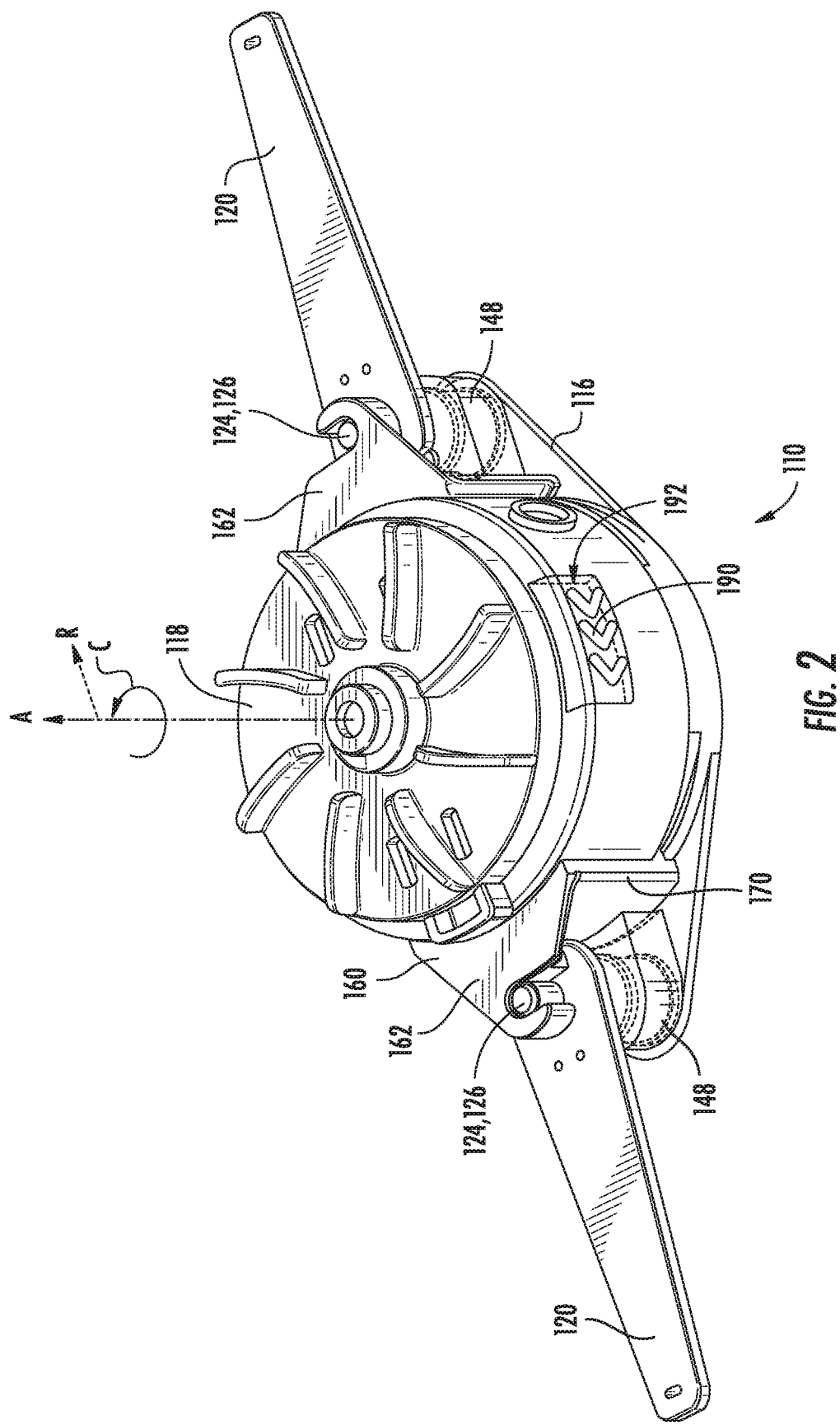
FIG. 2 provides a top perspective view of a trimmer head for a landscape trimmer according to exemplary embodiments of the present disclosure.
Figure 3:
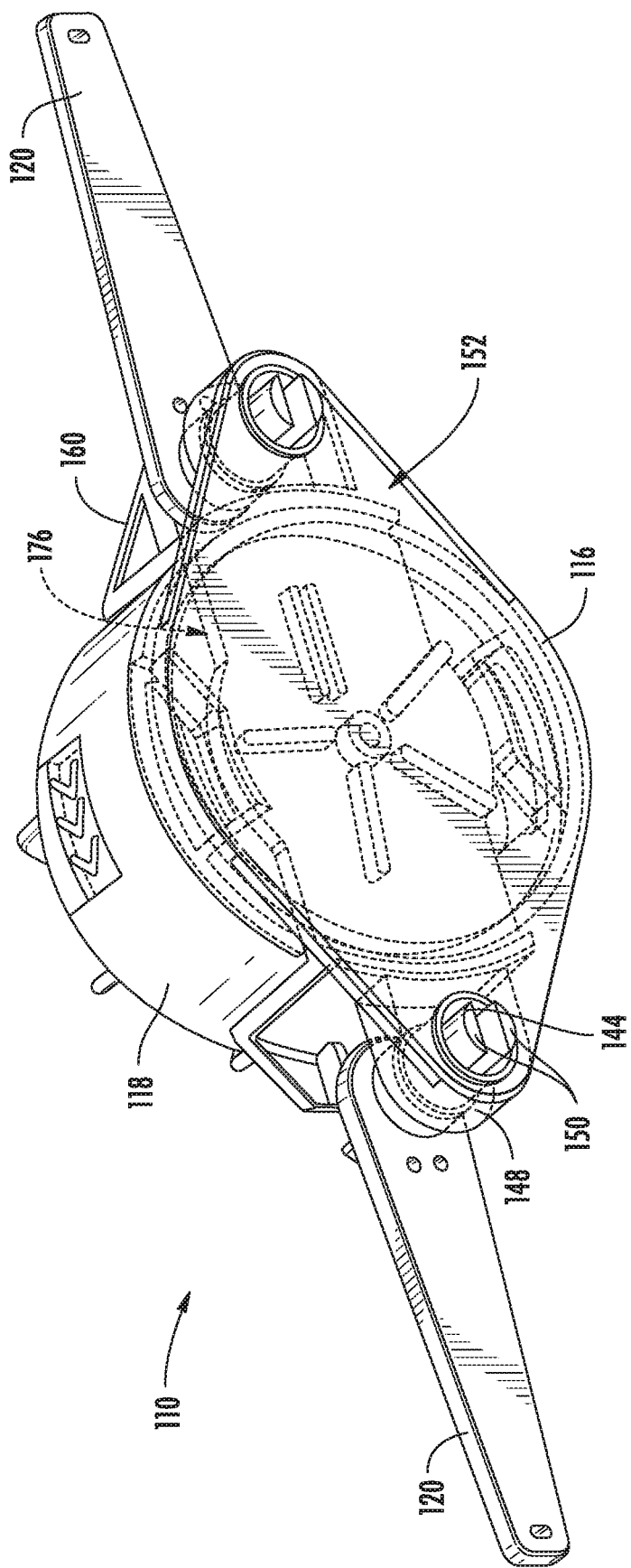
FIG. 3 provides a bottom perspective view of the exemplary trimmer head of FIG. 2.
Figure 4:
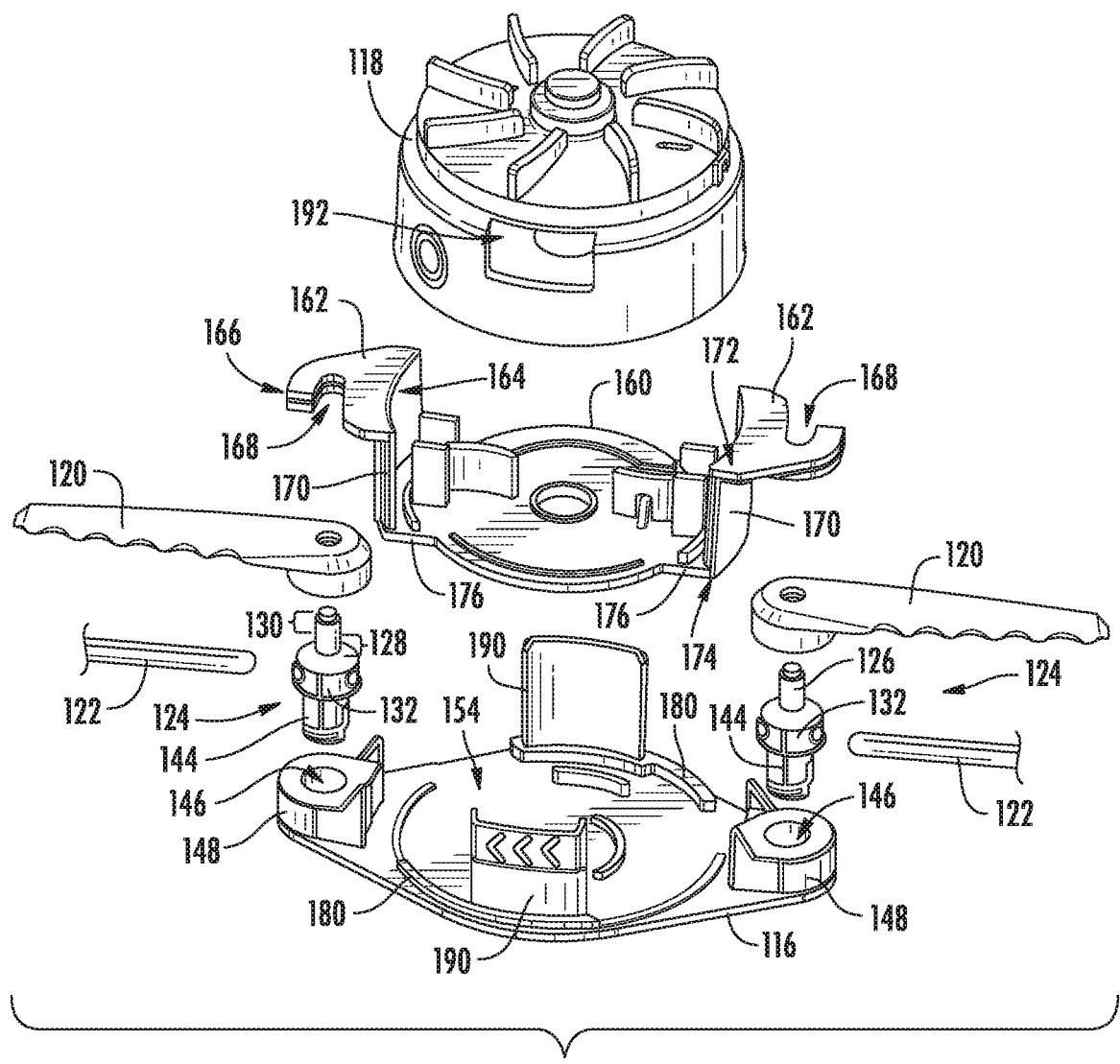
FIG. 4 provides an exploded perspective view of the exemplary trimmer head of FIG. 2.
Figure 5:
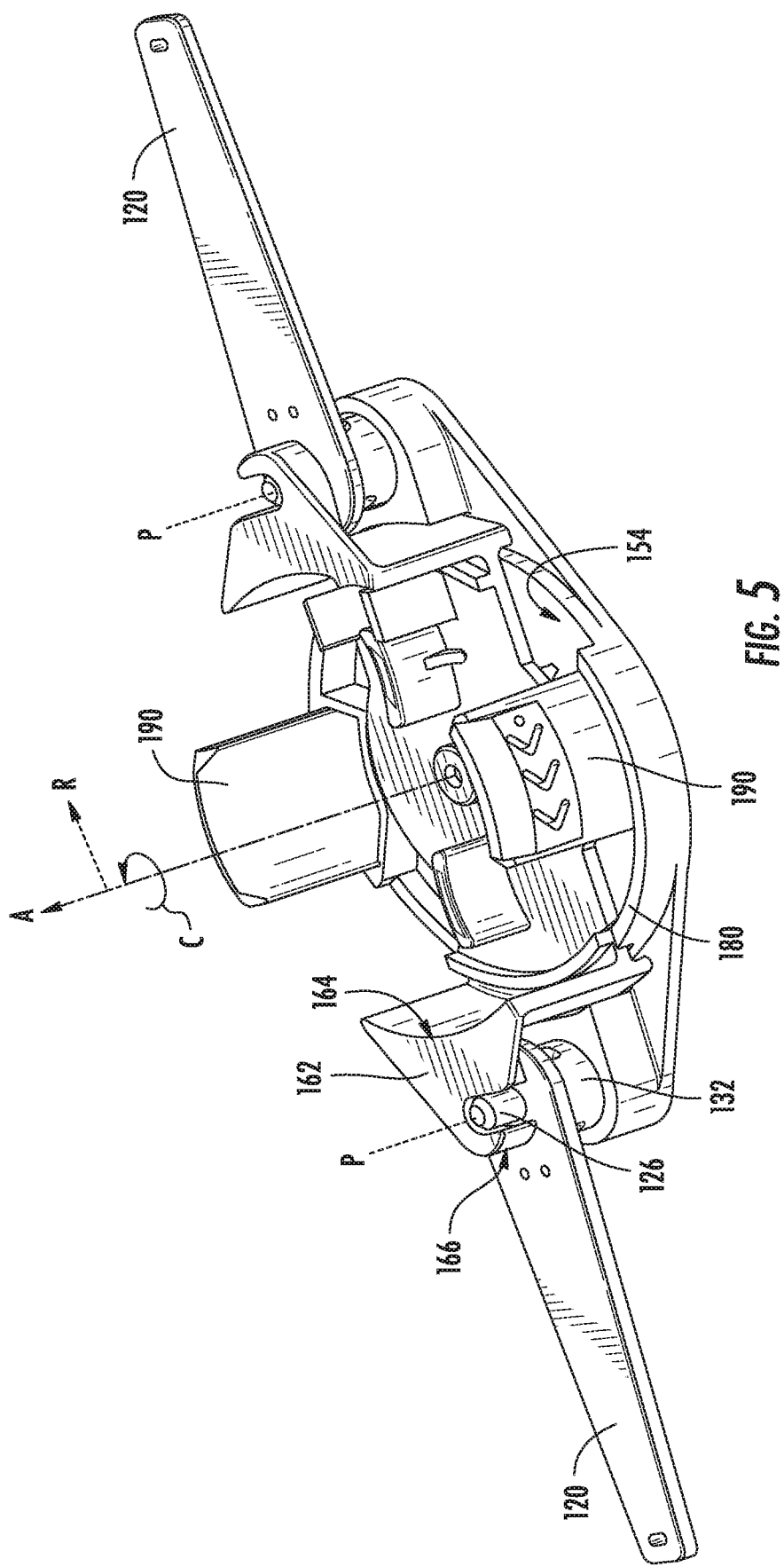
FIG. 5 provides a perspective view of a portion of the exemplary trimmer head of FIG. 2.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Turning now to the figures, FIGS. 1 through 8 provide various views illustrating a trimmer head 110 for a landscape trimmer 100, according to exemplary embodiments of the present disclosure.

In certain embodiments, the landscape trimmer 100 is a hand-held powered landscape trimmer 100 that include an elongated shaft 112 for supporting a handle with a grip (not pictured), as generally shown in FIG. 1. However, these embodiments are merely provided for illustrative purposes, and are not intended to limit the present disclosure to any particular landscape trimmer. Thus, it is understood that in alternative embodiments, another suitable type of powered trimmer may be provided and, for example, may include a frame and wheels for movement over the ground.

Generally, the trimmer 100 includes an output shaft mechanically engaged with a motor 114 (e.g., a two-cycle gas engine, an electric motor, etc.) for driving rotation of the trimmer head 110. As shown, the trimmer head 110 defines an axial direction A (e.g., at a base plate 116 thereof), as well as radial direction R perpendicular to the axial direction A and a circumferential direction C about the axial direction A. An assembly cap 118 is generally couplable to and rotatable with the output shaft of the motor 114. As will described in greater detail below, a base plate 116 of the trimmer head 110 is selectively attached to the assembly cap 118 to rotate therewith. One or more flail blades 120 or trimmer lines (e.g., folded trimmer line 122) may be provided on the base plate 116 to rotate with the trimmer head 110 and act as a cutting agent (e.g., for grass, shrubs, vegetation, etc.).

As shown, one or more pivot heads 124 may be attached (e.g., selectively attached) to the base plate 116. When attached, the pivot heads 124 are rotationally fixed to the base plate 116 and may thus rotate with the base plate 116. In other words, the pivot heads 124 may be rotated together about the axial direction A. Nonetheless, in some such embodiments, each pivot head 124 is generally permitted to pivot on the base plate 116 about its own corresponding pivot axis P (e.g., parallel to the axial direction A). Centrifugal force on the corresponding cutting agent (e.g., flail blade 120 or trimmer line 122) by the pivot head 124 tends to extend the cutting agent outward (e.g., in the radial direction R), thus establishing frictional contact between the cutting agent and the extended post 126. Tangential force imparted to the cutting agent during a cutting action may then pivot both the cutting agent and the pivot head 124. When a trimmer line 122 is provided as a cutting agent, pivoting of the pivot head 124 and trimmer line 122 about the pivot axis P may advantageously mitigate the effects of vibrations or hard impacts.

Each pivot head 124 includes a corresponding extended post 126 to hold or support a flail blade 120 thereon. When assembled, the extended post 126 may be held above (e.g., spaced apart) from the base plate 116 and extend axially (e.g., along the corresponding pivot axis P or parallel to the axial direction A). The corresponding flail blade 120 may define an aperture through which the extended post 126 is permitted. Thus, the extended post 126 may include a blade support surface 128 (e.g., defined about the corresponding pivot axis P of the pivot head 124) that can receive or generally hold the flail blade 120 thereon. In some such embodiments, the axial height or thickness of at least a portion of the flail blade 120 may be less than the axial height of the extended post 126. At least a portion of the extended post 126, such as an upper support surface 130, may be positioned above the flail blade 120 (e.g., directly above the blade support surface 128) as the flail blade 120 is received upon the blade support surface 128.

In certain embodiments, each pivot head 124 includes a main body 132 from which the extended post 126 is projected. For instance, the extended post 126 may project from the main body 132 to a free end at which no additional or enlarged features are permanently affixed. When assembled, the main body 132 may rest on or be held above the base plate 116. In turn, the main body 132 may be positioned between the extended post 126 and the base plate 116 (e.g., along the corresponding pivot axis P or relative to the axial direction A).

Figure 6:
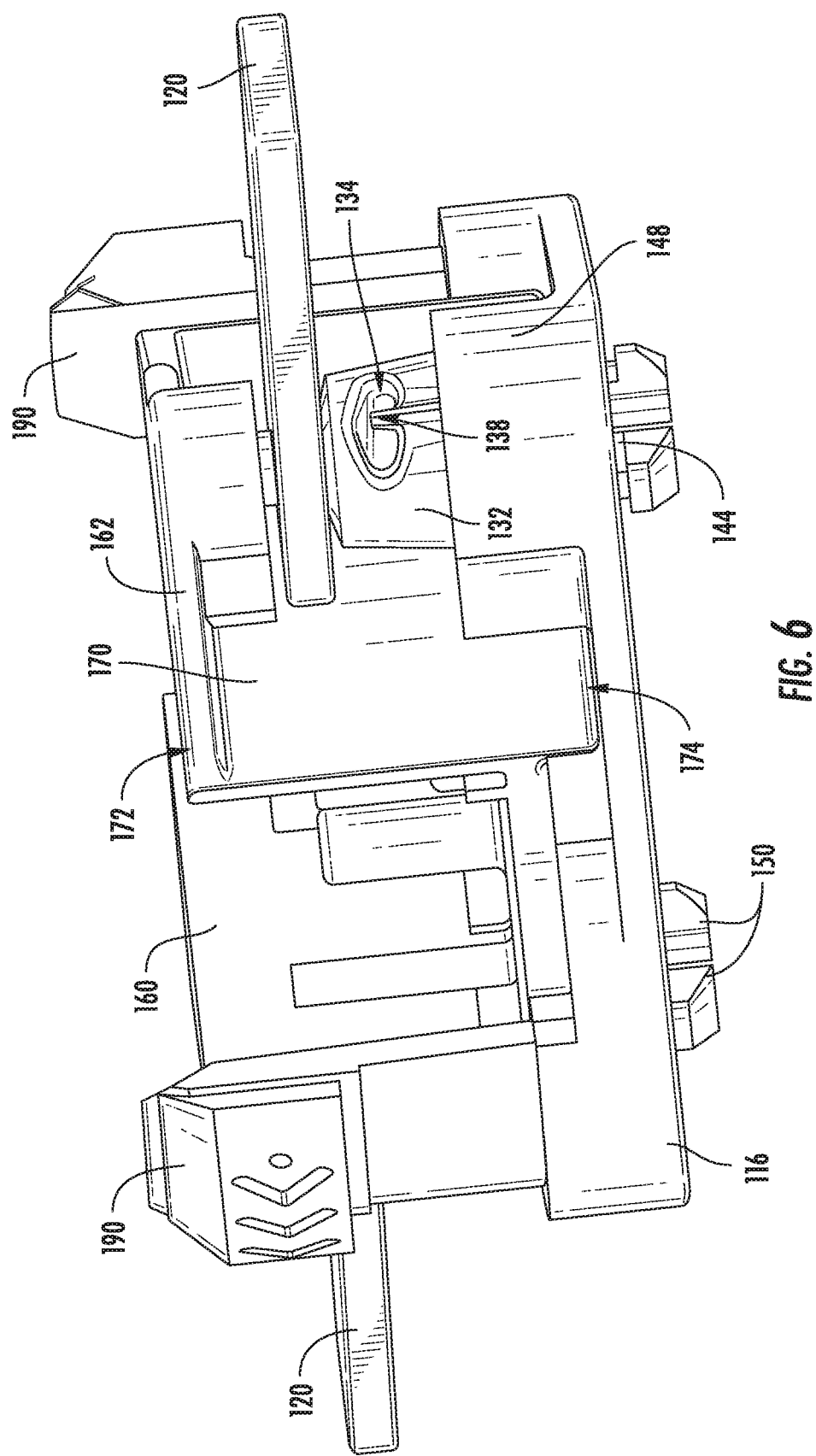
FIG. 6 provides a side view of a portion of the exemplary trimmer head of FIG. 2.

In exemplary embodiments, the main body 132 defines a string slot 134 that can receive a string trimmer line 122 therethrough. For instance, the string slot 134 may be defined as one or more openings through which two halves of a folded trimmer line 122 may be inserted or received. In optional embodiments, the string slot 134 is defined by a wall and projection 138 cooperating to define a pair of line receptacles (e.g., with an intermediate passage therebetween). The projection 138 separates the receptacles, and the intermediate passage thus communicates with the receptacles through respective channels. Thus, a continuous opening may be defined between the receptacles through the intermediate passage and the channels, as illustrated in FIG. 6.

In additional or alternative embodiments, the pivot head 124 includes a head support 144 that is received (e.g., selectively received) within a complementary support void 146 defined by and within the base plate 116. Optionally, the support void 146 may be formed from a support boss 148 extending axially upward (e.g., upward relative to the axial direction A) from a top surface 154 of base plate 116. As shown, the head support 144 extends (e.g., from the main body 132) in an opposite direction from the extended post 126. When assembled, the head support 144 may thus be positioned opposite from the extended post 126 (e.g., relative to the axial direction A). In some such embodiments, the head support 144 may act to retain the pivot head 124 on the base plate 116. For instance, the head support 144 may include one or more flexible clips or fingers 150 biased outwardly (e.g., radially outward from the corresponding pivot axis P) to releasably engage a bottom surface 152 of the base plate 116, and flexible inwardly (e.g., radially inward toward the pivot axis P) to allow the head support 144 to move into and out of the support void 146. Alternatively, the head support 144 may include a different structure to releasably retain or permanently retain the pivot head 124 relative to the base plate 116.

In some embodiments, multiple pivot heads 124 are provided at discrete circumferential locations on the base plate 116. Thus, each pivot head 124 may be circumferentially spaced about the axial direction A. In the illustrated embodiments, two pivot heads 124 are shown at two discrete circumferential locations on the base plate 116. The two pivot heads 124 may be circumferentially spaced apart from each other more than 90° about the axial direction A (e.g., along the circumferential direction C). In specific embodiments, the pivot heads 124 are spaced 180° apart from each other along the circumferential direction C. However, it is understood that alternative embodiments may include any suitable number or arrangement of pivot heads 124 on the base plate 116 in one or more circumferential locations.

Along with one or more pivot heads 124, a blade retainer 160 is provided on the base plate 116 to selectively pivot or rotate about the axial direction A. Specifically, the blade retainer 160 may not only rotate together or in tandem with the base plate 116 (e.g., during trimming operations), the blade retainer 160 may also rotate about the axial direction A relative to the base plate 116. In certain embodiments, when assembled, the blade retainer 160 is rotatably mounted to the base plate 116 to rotate relative to the base plate 116 between at least a first position (e.g., FIGS. 2 and 7) and a second position (e.g., FIG. 8).

As shown, the blade retainer 160 includes at least one radial arm 162 to selectively engage with a corresponding pivot head 124. For instance, each pivot head 124 may correspond to a discrete radial arm 162 of the blade retainer 160. Generally, the radial arm 162 extends along the radial direction R between a proximal end 164 and a distal end 166. When assembled, the proximal end 164 is positioned radially inward (e.g., radially inward relative to the axial direction A) from the pivot head 124 while the distal end 166 is positioned to, or radially outward from, the radial location of the pivot head 124. The proximal end 164 or distal end 166 may be positioned in a common plane (e.g., radial plane) with at least a portion of the extended post 126 (e.g., the upper support surface 130), and may thus selectively engage (e.g., contact directly or indirectly) the extended post 126. Nonetheless, another portion of the extended post 126 (e.g., the blade support surface 128 or main body 132) may be positioned beneath the radial arm 162 (e.g., along the corresponding pivot axis P or relative to the axial direction A). For instance, the blade support surface 128 may be positioned between the distal end 166 of the blade retainer 160 and the base plate 116 relative to the axial direction A.

In moving between the first position and the second position, the radial arm 162 of the blade retainer 160 may be moved into and out of alignment with the extended post 126. In the first position, the radial arm 162 may be circumferentially aligned with the pivot head 124. For instance, the distal end 166 of the radial arm 162 may be positioned at a common circumferential location with the extended post 126. The radial arm 162 may engage extended post 126 (e.g., at the upper support surface 130). Moreover, at least a portion of the radial arm 162 may bound at least a portion of the extended post 126. For instance, the radial arm 162 may block or cover a portion of the extended post (e.g., the blade support surface 128) along the corresponding pivot axis P. Optionally, the radial arm 162 may define a circumferential channel 168 (e.g., C-shaped channel) having a single opening through which the extended post 126 may be selectively received (e.g., in the first position). The blade support surface 128 (and any flail blade 120 received thereon) may be held between the radial arm 162 and, for instance, the main body 132 or base plate 116. Thus, in the first position, the flail blade 120 may be axially retained, or otherwise held, on the pivot head 124.

In contrast to the first position, the radial arm 162 may be circumferentially spaced apart from the pivot head 124 is the second position. For instance, the distal end 166 of the radial arm 162 may be positioned at a separate or discrete circumferential location from the circumferential location of the pivot head 124. In this second position, the radial arm 162 may be disengaged from the extended post 126 such that the extended post 126 (or any flail blade 120 thereon) is unimpeded and no longer blocked by the radial arm 162. Thus, in the second position, the flail blade 120 may be freely moved onto or off of the pivot head 124.

In some embodiments, the blade retainer 160 includes one or more intermediate members mechanically linking or attaching radial arm 162 (or radial arms 162) to the base plate 116. For instance, an axial arm 170 may extend axially downward (e.g., downward relative to the axial direction A) from (e.g., directly from) the radial arm 162. In certain embodiments, the axial arm 170 extends axially downward from (e.g., directly from) an upper end 172 located at the proximal end 164 of the radial arm 162 (e.g., above the blade support surface 128 or main body 132) to a lower end 174. The radial arm 162 may extend radially (e.g., radially outward) from the upper end 172 of the axial arm 170. When assembled, the lower end 174 may be positioned lower than the blade support surface 128 (e.g., relative to the axial direction A) and, for instance, at a top surface 154 of the base plate 116.

A mounting plate or arm 176 may extend radially inward (e.g., toward the axial direction A) from (e.g., directly from) the lower end 174 of the axial arm 170 (e.g., at a location or plane that is below the blade support surface 128 or main body 132). Additionally or alternatively, the mounting arm 176 may extend from the lower end 174 of the axial arm 170 to a mounting pin 178 rotatably securing the blade retainer 160 to the base plate 116. One or more guide walls 180 may define an enlarged radial groove through which the mounting arm 176 may radially extend. For instance, the guide walls 180 may extend axially (e.g., upward along the corresponding pivot axis P or relative to the axial direction A) from the base plate 116. As shown, the guide walls 180 may generally bound the mounting arm 176 along the circumferential direction C while permitting rotation between the first position and the second position. In some such embodiments, the guide walls 180 define, at least in part, the first position or the second position while preventing excess rotation of the blade retainer 160 (e.g., relative to the base plate 116).

Figure 7:
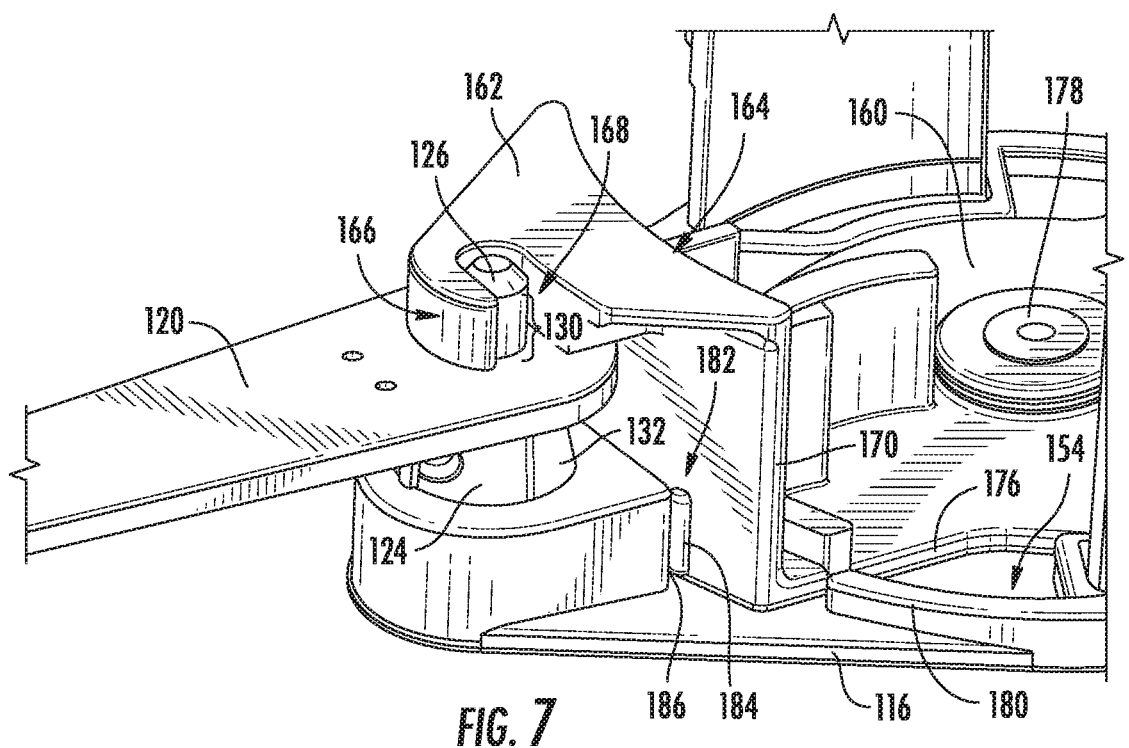
FIG. 7 provides a magnified perspective view of a base plate of a trimmer head in a first position according to exemplary embodiments of the present disclosure.
Figure 8:
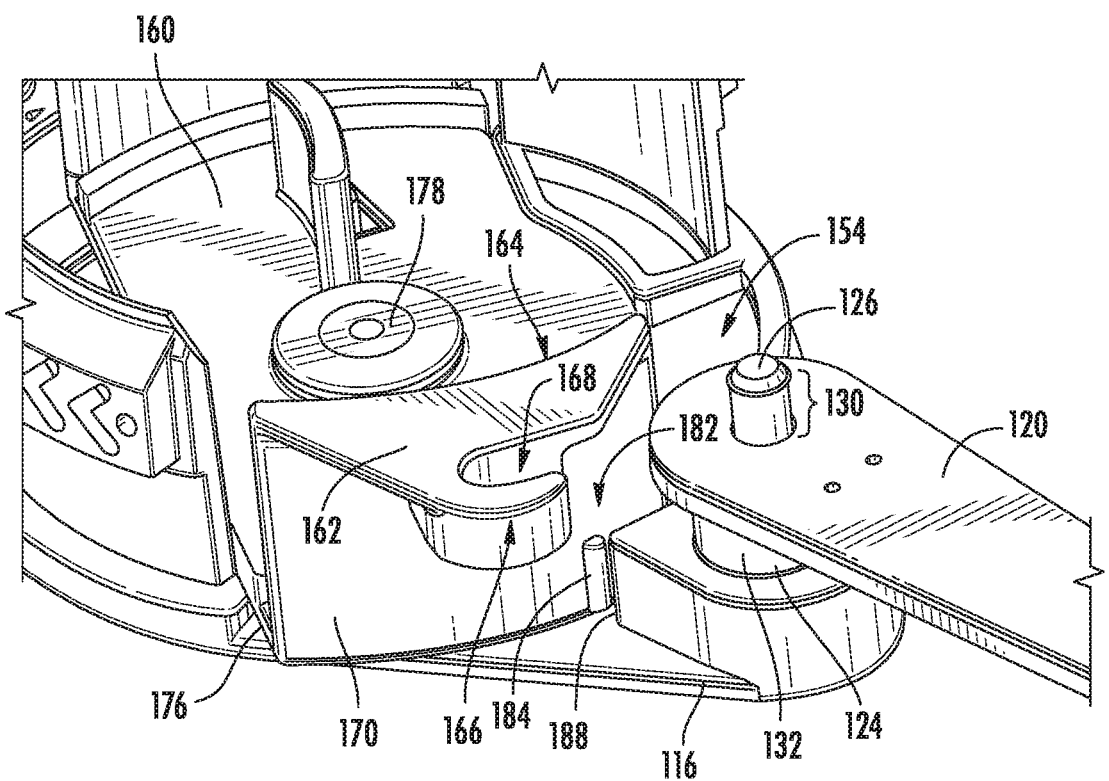
FIG. 8 provides a magnified perspective view of a base plate of a trimmer head in a second position according to exemplary embodiments of the present disclosure.

One or more lock assemblies 182 may be included to selectively hold the blade retainer 160 in the first position or the second position. As an example, a lock assembly 182 may include one or more resilient detents 184 to selectively engage one or more snap surfaces 186, 188. Specifically, the resilient detent 184 may be formed on a portion of the blade retainer 160 (e.g., the axial arm 170) while the one or more snap surfaces 186, 188 extend from a portion of the base plate 116 (e.g., at or on the support boss 148). In exemplary embodiments, the resilient detent 184 is held in a frictional-fit lock against first snap surface 186 (e.g., on one circumferential side of the support boss 148) in the first position, as illustrated in FIG. 7. In additional or alternative embodiments, the resilient detent 184 is held in a frictional-fit lock against a second snap surface 188 (e.g., on an opposite circumferential side of the support boss 148) in the second position, as illustrated in FIG. 8. Thus, the blade retainer 160 may be prevented from inadvertently moving out of the first position (e.g., during trimming operations) or the second position (e.g., when removing or replacing the flail blade 120 or pivot head 124 from the base plate 116).

In both the first position and the second position, at least a portion of blade retainer 160 may be held between the assembly cap 118 and the base plate 116 (e.g., along the axial direction A). In some embodiments, the mounting arm 176 is sandwiched between a top surface 154 of the base plate 116 and a bottom edge of the assembly cap 118. When assembled, one or more retention mechanisms (e.g., suitable mechanical fasteners) selectively join the base plate 116 to the assembly cap 118 and thereby hold the mounting arm 176 between the assembly cap 118 and the base plate 116. For instance, the base plate 116 may include one or more flexible fingers or clips 190 biased outwardly (e.g., radially outward from the axial direction A) to releasably engage a corresponding groove or channel 192 of the assembly cap 118, and flexible inwardly (e.g., radially inward toward the axial direction A) to allow the flexible clip 190 to move into and out of assembly cap 118. Optionally, the one or more retention mechanisms (e.g., flexible clips 190) may be positioned radially inward (e.g., inward along the radial direction R) from the radial arm 162. Thus, the assembly cap 118 may be attached to the base plate 116 radially inward from the radial arm 162. In additional or alternative embodiments, the axial arm 170 or the radial arm 162 of the blade retainer 160 is/are positioned radially outward from an outer wall of the assembly cap 118, thereby permitting the radial arm 162 to rotate relative to the base plate 116 without interference from the assembly cap 118.

Advantageously, embodiments of the present disclosure may permit the selective removal or attachment of a pivot head 124 or cutting agent (e.g., flail blade 120 or trimmer line 122) without requiring separation of a base plate 116 from an assembly cap 118 or other portion of a landscape trimmer 100. Additionally or alternatively, embodiments of the present disclosure may advantageously permit a user to selectively and non-exclusively utilize a flail blade 120 and trimmer line 122.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A trimmer head for a trimmer, the trimmer head comprising:
   a base plate defining an axial direction;
   a pivot head attached to the base plate, the pivot head comprising
      an extended post having a blade support surface to selectively receive a flail blade, and
      a main body positioned between the extended post and the base plate relative to the axial direction, the main body defining a string slot to receive a trimmer string line therethrough; and
   a blade retainer comprising a radial arm rotatably mounted to the base plate to rotate relative to the base plate between a first position at which the radial arm is circumferentially aligned with the pivot head and a second position at which the radial arm is circumferentially spaced apart from the pivot head,
   wherein, when in the first position, the blade support surface is positioned between the base plate and the radial arm relative to the axial direction.

2. The trimmer head of claim 1, wherein the blade retainer further comprises
   a mounting arm rotatably mounted to the base plate below the blade support surface relative to the axial direction, and
   an axial arm extending axially from a proximal end at the mounting arm to a distal end at the radial arm.

3. The trimmer head of claim 1, further comprising:
   a first snap surface extending from the base plate; and
   a second snap surface extending from the base plate and circumferentially spaced apart from the first snap surface,
   wherein the blade retainer further comprises a resilient detent held in a frictional-fit lock against the first snap surface in the first position and against the second snap surface in the second position.

4. The trimmer head of claim 1, wherein the pivot head is a first pivot head, wherein the radial arm is a first radial arm, wherein the flail blade is a first flail blade, wherein the trimmer head further comprises a second pivot head attached to the base plate, the second pivot head comprising an extended post having a blade support surface to selectively receive a second flail blade, and
   wherein the blade retainer further comprises a second radial arm rotatably mounted to the base plate to rotate relative to the base plate between the first position and the second position, the second radial arm being circumferentially aligned with the second pivot head in the first position and circumferentially spaced apart from the second pivot head in the second position.

5. The trimmer head of claim 4, wherein the first pivot head and the second pivot head are circumferentially spaced apart more than 90° about the axial direction.

6. The trimmer head of claim 1, wherein the pivot head further comprises a head support pivotally received within a complementary support void defined within the base plate, the head support being positioned opposite from the extended post relative to the axial direction.

7. The trimmer head of claim 1, further comprising an assembly cap holding the blade retainer to the base plate along the axial direction.

8. The trimmer head of claim 1, wherein the radial arm defines a circumferential channel to receive the extended post in the first position.

9. A trimmer head for a trimmer, the trimmer head comprising:
- a base plate defining an axial direction;
- a pivot head attached to the base plate, the pivot head comprising an extended post having a blade support surface to selectively receive a flail blade; and
- a blade retainer comprising
  - a mounting arm rotatably mounted to the base plate below the blade support surface relative to the axial direction,
  - an axial arm extending axially from a proximal end at the mounting arm to a distal end above the blade support surface, and
  - a radial arm extending radially from the distal end to rotate relative to the base plate between a first position at which the radial arm is circumferentially aligned with the pivot head and a second position at which the radial arm is circumferentially spaced apart from the pivot head,
  - wherein, when in the first position, the blade support surface is positioned between the radial arm and the base plate relative to the axial direction.

10. The trimmer head of claim 9, further comprising:
- a first snap surface extending from the base plate; and
- a second snap surface extending from the base plate and circumferentially spaced apart from the first snap surface,
- wherein the blade retainer further comprises a resilient detent held in a frictional-fit lock against the first snap surface in the first position and against the second snap surface in the second position.

11. The trimmer head of claim 9, wherein the pivot head is a first pivot head, wherein the radial arm is a first radial arm, wherein the flail blade is a first flail blade, wherein the trimmer head further comprises a second pivot head attached to the base plate, the second pivot head comprising an extended post having a blade support surface to selectively receive a second flail blade, and
- wherein the blade retainer further comprises a second radial arm rotatably mounted to the base plate to rotate relative to the base plate between the first position and the second position, the second radial arm being circumferentially aligned with the second pivot head in the first position and circumferentially spaced apart from the second pivot head in the second position.

12. The trimmer head of claim 11, wherein the first pivot head and the second pivot head are circumferentially spaced apart more than 90° about the axial direction.

13. The trimmer head of claim 9, wherein the pivot head further comprises a head support pivotally received within a complementary support void defined within the base plate, the head support being positioned opposite from the extended post relative to the axial direction.

14. The trimmer head of claim 9, an assembly cap holding the blade retainer to the base plate along the axial direction.

15. The trimmer head of claim 9, wherein the radial arm defines a circumferential channel to receive the extended post in the first position.

16. A trimmer head for use with a trimmer, the trimmer head comprising:
- a base plate defining an axial direction;
- a first snap surface extending from the base plate;
- a second snap surface extending from the base plate and circumferentially spaced apart from the first snap surface;
- a pivot head attached to the base plate, the pivot head comprising an extended post having a blade support surface to selectively receive a flail blade; and
- a blade retainer comprising
  - a radial arm rotatably mounted to the base plate to rotate relative to the base plate between a first position at which the radial arm is circumferentially aligned with the pivot head and a second position at which the radial arm is circumferentially spaced apart from the pivot head, and
  - a resilient detent held in a frictional-fit lock against the first snap surface in the first position and against the second snap surface in the second position.

17. The trimmer head of claim 16, wherein the pivot head is a first pivot head, wherein the radial arm is a first radial arm, wherein the flail blade is a first flail blade, wherein the trimmer head further comprises a second pivot head attached to the base plate, the second pivot head comprising an extended post having a blade support surface to selectively receive a second flail blade
- wherein the blade retainer further comprises a second radial arm rotatably mounted to the base plate to rotate relative to the base plate between the first position and the second position, the second radial arm being circumferentially aligned with the second pivot head in the first position and circumferentially spaced apart from the second pivot head in the second position, and
- wherein the first pivot head and the second pivot head are circumferentially spaced apart more than 90° about the axial direction.

18. The trimmer head of claim 16, wherein the pivot head further comprises a head support pivotally received within a complementary support void defined within the base plate, the head support being positioned opposite from the extended post relative to the axial direction.

19. The trimmer head of claim 16, further comprising an assembly cap holding the blade retainer to the base plate along the axial direction.

20. The trimmer head of claim 16, wherein the radial arm defines a circumferential channel to receive the extended post in the first position.

* * * * *